United States Patent [19]
Fiete et al.

[11] Patent Number: 5,881,182
[45] Date of Patent: Mar. 9, 1999

[54] ADAPTIVE PROCESS FOR REMOVING STREAKS IN DIGITAL IMAGES

[75] Inventors: Robert D. Fiete, Fairport; Craig A. Laben, Penfield, both of N.Y.

[73] Assignee: Eastman Kodak Company, Rochester, N.Y.

[21] Appl. No.: 873,882

[22] Filed: May 12, 1997

[51] Int. Cl.⁶ .................. G06K 9/40; H04N 1/409
[52] U.S. Cl. ............. 382/275; 382/205; 358/463; 358/483; 348/248; 348/249
[58] Field of Search ................... 382/275, 254, 382/260, 205; 358/463, 482, 483, 474, 471, 494; 348/241, 248, 249, 250, 297, 298

[56] References Cited

U.S. PATENT DOCUMENTS

| | | | |
|---|---|---|---|
| 4,329,709 | 5/1982 | Masuda | 348/248 |
| 4,556,911 | 12/1985 | Imaide et al. | 348/297 |
| 4,597,014 | 6/1986 | Suzuki | 348/297 |
| 4,608,608 | 8/1986 | Nishizawa et al. | 348/248 |
| 5,065,444 | 11/1991 | Garber | 382/275 |

*Primary Examiner*—Scott Rogers
*Attorney, Agent, or Firm*—Thomas H. Close

[57] ABSTRACT

A method of removing columnar streaks from a digital image of the type in which it is assumed that pixels in a predetermined region near a given pixel are strongly related to each other and employing gain and offset values to compute streak removal information, a test is performed for a strong relation between the pixels in a predetermined region near a given pixel and streak removal information is computed only if such a strong relationship exists, whereby image content that does not extend the full length of the image in the column direction will not be interpreted as a streak.

3 Claims, 6 Drawing Sheets

ADAPTIVE PROCESS FOR REMOVING STREAKS IN DIGITAL IMAGES

FIELD OF THE INVENTION

The invention relates generally to the field of image processing, and in particular to an image processing method for removing streaks in digital images. The invention is particularly useful in removing streaking in digital images that are acquired by a linear image sensing array, but may also be used to remove streaks in conventional film that are caused by the camera or processing equipment.

BACKGROUND OF THE INVENTION

Every detector in an electronic image sensor, such as a CCD image sensor, may have a different response function that relates the input intensity of light (or other electromagnetic radiation) to a pixel value in the digital image. This response function can change with time or operating temperature. Image sensors are calibrated such that each detector has the same response for the same input intensity (illumination radiance). The calibration is generally performed by illuminating each detector with a given radiance from a calibration lamp and then recording the signal from each detector to estimate the response function of the detector. The response function for each detector is used to equalize the output of all of the detectors such that a uniform illumination across all of the detectors will produce a uniform output.

FIG. 1 shows a schematic of an image acquired by a linear image sensing arrays. In such an image, if errors in estimating the response curve of a detector are different from the errors in the response curve of an adjacent detector, the detector responses will not be equalized and streaking 2 will appear in the image along the scan direction indicated by arrow A. Often to achieve a very long array, several image sensor chips are joined together to form a single linear image sensor. When calibration errors occur between chips, the streaking is generally referred to as banding, as illustrated at reference numeral 4.

Even when the detectors are calibrated to minimize the streaking in the image, some errors from the calibration process are unavoidable. Each detector is sensitive to a slightly different spectrum of light, but they are all calibrated using the same calibration lamp with a broad, non-uniform spectrum. Since the scene spectrum is unknown, the calibration process assumes the spectrum of the calibration lamp and the scene are identical. The spectrum of the calibration lamp will usually be somewhat different than the spectrum of the scene being imaged, hence calibration errors will occur. Calibration errors also occur because the calibration process includes an incomplete model of the complete optical process and because the response function for each detector changes over time and operating temperature.

Streaking can be seen in uniform areas of an image acquired by a linear detector and become very apparent when the contrast of the image is enhanced. Calibration differences between the red, green, and blue detectors of color imaging systems produce streaks of varying colors in the composite color image. These streaks not only reduce the aesthetic quality of digital images but can impact the interpretability of features in the images. Streaking also severely degrades the performance of pattern recognition and feature extraction algorithms.

Streaks can be attenuated by reducing the contrast of the image or by blurring the image in a direction perpendicular to the streaking, but these methods degrade the quality of the overall image. Previously developed algorithms designed to remove the streaks while preserving the contrast and sharpness of the image assume that the streaks do not change over time or that the pixels near each other are strongly correlated. In general these assumptions are not true. The responsivity of each detector, and hence the magnitudes of the streaks, changes over time, therefore methods that remove fixed patterns of streaks will not always work. U.S. Pat. No. 5,065,444, issued Nov. 12, 1991, to Garber discloses a method of removing streaks from digital images by assuming that pixels in a predetermined region are strongly correlated, examining the pixels in the region, computes the difference between the pixels in the region, thresholding the pixel differences lower than a predetermined value, computes a gain and offset value from the distribution of differences, and uses the gain and offset value to remove the streaking. Methods that assume a strong correlation between pixels that are near each other, such as the one disclosed by Garber will interpret scene variations as streaks and produce additional streaking artifacts in the image as a result of attempting to remove existing streaks. FIG. 2a shows an image having streaks 2 and linear features 6 that are in the same direction as the streaks. As shown in FIG. 2b, the correction of the streaks 2 using the method taught by Garber remove the streaks 2, but results in additional streaking artifacts 8.

There is a need therefore for an improved digital image processing method for removing streaks in images.

SUMMARY OF THE INVENTION

The object of the present invention is achieved in a method of removing columnar streaks from a digital image of the type in which it is assumed that pixels in a predetermined region near a given pixel are strongly related to each other and employing gain and offset values to compute streak removal information, by testing for a strong relation between the pixels in a predetermined region near a given pixel and computing streak removal information only if such a strong relationship exists, whereby image content that does not extend the full length of the image in the columnar direction will not be interpreted as a streak.

The method of the present invention adaptively removes streaking, as well as banding, in digital images without reducing the sharpness or contrast of the image. Streaking occurs in images output from linear scanners and is generally caused by differences in the responsivity of detectors or amplifiers. The method disclosed detects pixel locations in the image where pixel-to-pixel differences caused by streaking can be distinguished from normal variations in the scene data. A linear regression is performed between each pair of adjacent pixels in a direction perpendicular to the streaking at the detected locations. A statistical outlier analysis is performed on the predicted values to remove the pixels that are not from the streaking. A second linear regression is performed to calculate the slope and offset values. The slope is set to unity if it is not statistically different from unity, and the offset is set to zero if it is not statistically different from zero. The slope and offset values are then used to remove the streaking from the corresponding line of image data.

ADVANTAGEOUS EFFECT OF THE INVENTION

This invention adaptively removes streaking in a digital image by testing for a strong correlation between the pixels in a predetermined region and computing streak removal information only if such a strong relationship exists. This process will remove the residual streaks that appear even after a calibration is performed on the imaging sensor. This method does not reduce the contrast or the sharpness of the image.

DETAILED DESCRIPTION OF THE INVENTION

Figure 1:
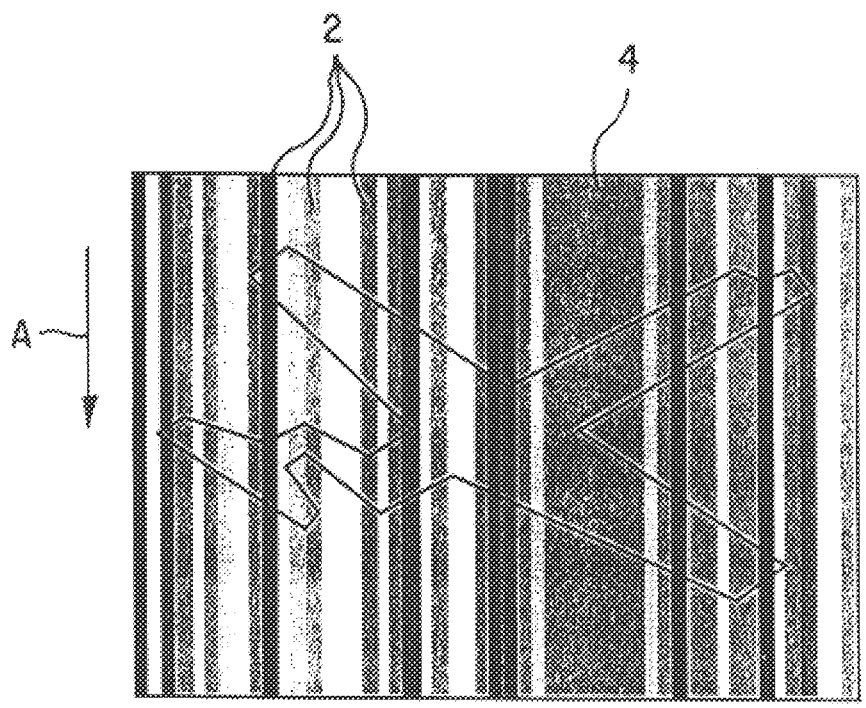
FIG. 1 illustrates the streaking artifact in an image.
Figure 2A:
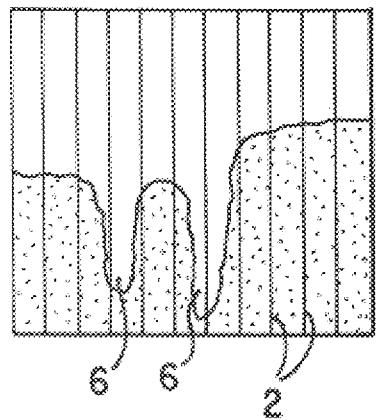
FIGS. 2(a)–2(b) illustrate the artifacts produced by methods that assume that pixels in a predetermined region near a given pixel are strongly related to each other.
Figure 2B:
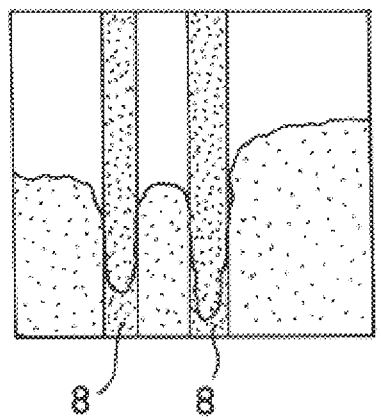
Figure 3:
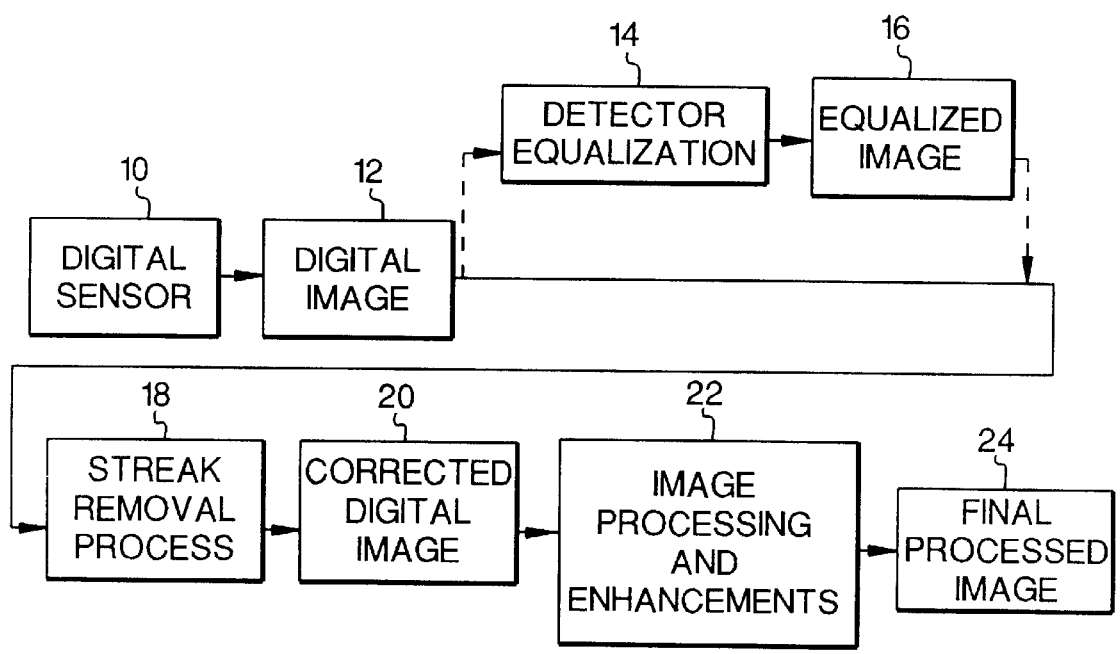
FIG. 3 is a diagram showing an image processing chain using the present invention.

The streak removal process of the present invention can be employed in a typical image processing chain, such as the one shown in FIG. 3. A digital sensor 10, e.g. a linear scanner used in a camera system or a photographic scanner, outputs a digital image 12. If the detectors have gone through a calibration process, then the digital image 12 may go through a detector equalization process 14 to produce an equalized image 16. Both the digital image 12 and the equalized image 16 will contain streaks 2 as shown in FIG. 1. The digital image 12 or the equalized digital image 16 is processed through the streak removal process 18 to produce a corrected digital image 20 that has the streaks removed. This corrected digital image 20 is then processed through the nominal image processing chain and enhancements 22 to produce the final processed image 24. Without the streak removal process 18, the image processing and enhancements 22 may actually reduce the quality of the final processed image 24, especially if the digital image 12 is low in contrast or if the image processing and enhancements 22 includes a feature extraction algorithm.

If the original image was a photographic image having streaks or scratches resulting from the photographic, for example the scratches seen in old movie film, the images may be scanned in a high quality scanner and the streaks or scratches removed by the method of the present invention.

For the discussion of this invention it will be assumed that the streaks occur in the columnar direction of the digital image 12. The pixel at column coordinate x and row coordinate y has a digital count value i(x,y). If $d_x$ is the detector for column x, then the response curve for detector $d_x$ in the digital sensor 10 can be modeled as a linear function of the input illumination radiance, thus $$i(x,y) = a_x I(x,y) + b_x,  \quad (1)$$

where I(x,y) is the intensity of the illumination radiance at location (x,y) in the image, $a_x$ is the gain for detector $d_x$, and $b_x$ is the bias for detector $d_x$.

Streaks occur in the digital image 12 because adjacent detectors in the digital sensor 10 have different response curves. The difference $\Delta(x,y)$ between adjacent pixels is given by $$\Delta(x,y)=i(x,y)-i(x+1,y)=a_x I(x,y)+b_x-a_{x+1} I(x+1,y)-b_{x+1}, \quad (2)$$

and is dependent on the detector response as well as the difference between the illumination radiance incident on the adjacent pixels. If the detectors $d_x$ and $d_{x+1}$ have the same response curves, i.e. if $a_x=a_{x+1}$ and $b_x=b_{x+1}$, then $$\Delta(x,y)=i(x,y)-i(x+1,y)=a_x[I(x,y)-I(x+1,y)], \quad (3)$$

and the difference between i(x,y) and i(x+1,y) is proportional to the difference between the illumination radiance incident on the adjacent pixels, which is desired, and no streaks due to sensor calibration errors will be present.

If I(x,y)=I(x+1,y) in Eq. (2) then $$\Delta(x,y)=i(x,y)-i(x+1,y)=[a_x-a_{x+1}]I(x,y)+[b_x-b_{x+1}], \quad (4)$$

and the difference between i(x,y) and i(x+1,y) is entirely from the different response curves between detectors $d_x$ and $d_{x+1}$.

If I(x+1,y) is substituted for I(x,y) using Eq. (1) then $$i(x,y) = a_x \frac{i(x+1,y)-b_{x+1}}{a_{x+1}} + b_x = \frac{a_x}{a_{x+1}} i(x+1,y) + \left[ b_x - \frac{a_x}{a_{x+1}} b_{x+1} \right]. \quad (5)$$

If $$\Delta a_x \equiv \frac{a_x}{a_{x+1}} \text{ and } \Delta b_x \equiv b_x - \frac{a_x}{a_{x+1}} b_{x+1}$$

then $$i(x,y)=\Delta a_x i(x+1,y)+\Delta b_x \quad (6)$$

and i(x,y) is just a linear transformation of i(x+1,) with a slope $\Delta a_x$ and offset $\Delta b_x$. By determining $\Delta a_x$ and $\Delta b_x$, the streaking between columns x and x+1 can be removed if the pixel count values i(x+1,y) are replaced with i'(x+1,y) where $$i'(x+1,y) \equiv \Delta a_x i(x+1,y)+\Delta b_x. \quad (7)$$

The difference between adjacent pixels is now $$\Delta(x,y) = i(x,y) - i'(x+1,y) = a_x I(x,y) + b_x - \quad (8)$$
$$\{\Delta a_x[a_{x+1} I(x+1,y) + b_{x+1}] + \Delta b_x\} = a_x I(x,y) + b_x -$$
$$\left\{ \frac{a_x}{a_{x+1}} [a_{x+1} I(x+1,y) + b_{x+1}] + b_x - \frac{a_x}{a_{x+1}} b_{x+1} \right\} =$$
$$a_x[I(x,y) - I(x+1,y)],$$

which is the desired result from Eq. (3), hence no streaks due to sensor calibration error will be present.

Methods that determine $\Delta a_x$ and $\Delta b_x$ by assuming that the illumination radiance is always approximately equal in a predetermined region near pixel i(x,y), e.g. I(x,y)≈I(x+1,y), such as the one disclosed in U.S. Pat. No. 5,065,444, will generate poor estimates of $\Delta a_x$ and $\Delta b_x$ where I(x,y)≠I(x+1,y) and artifacts will occur.

Figure 4A:
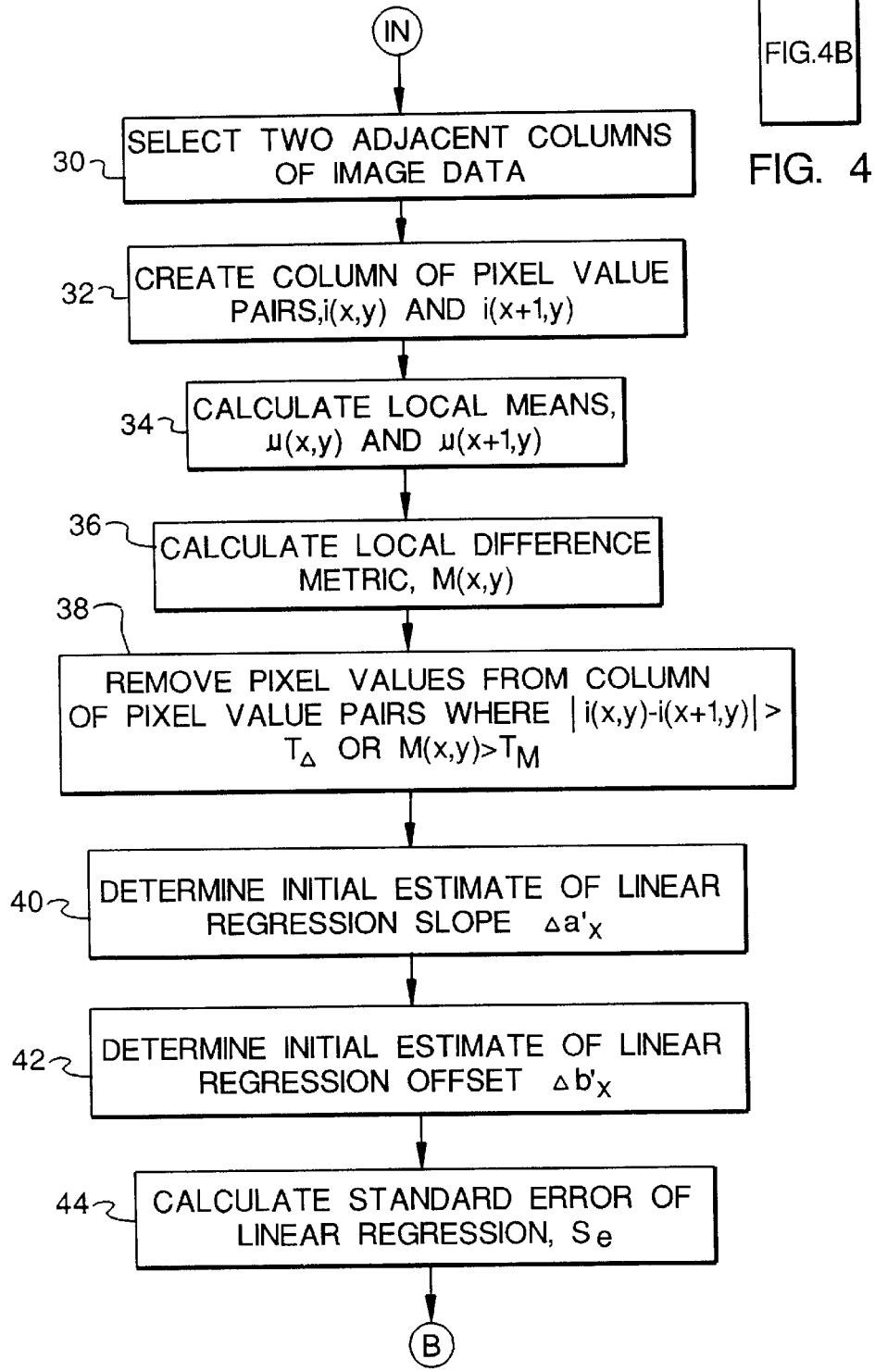
FIG. 4, made up of FIG. 4(a) and FIG. 4(b), is a flow chart of the streak removal process according to the present invention.
Figure 4B:
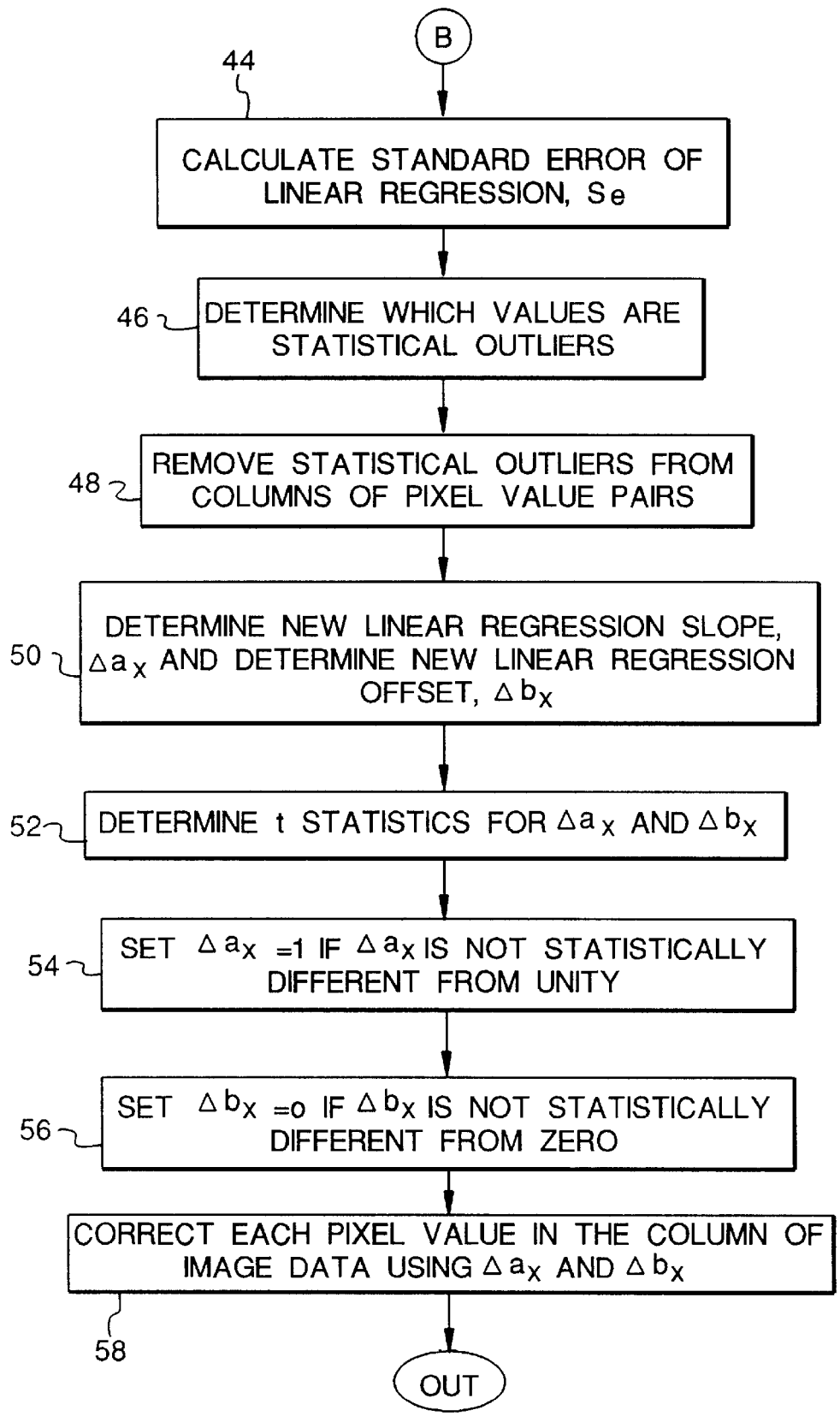
Figure 5:
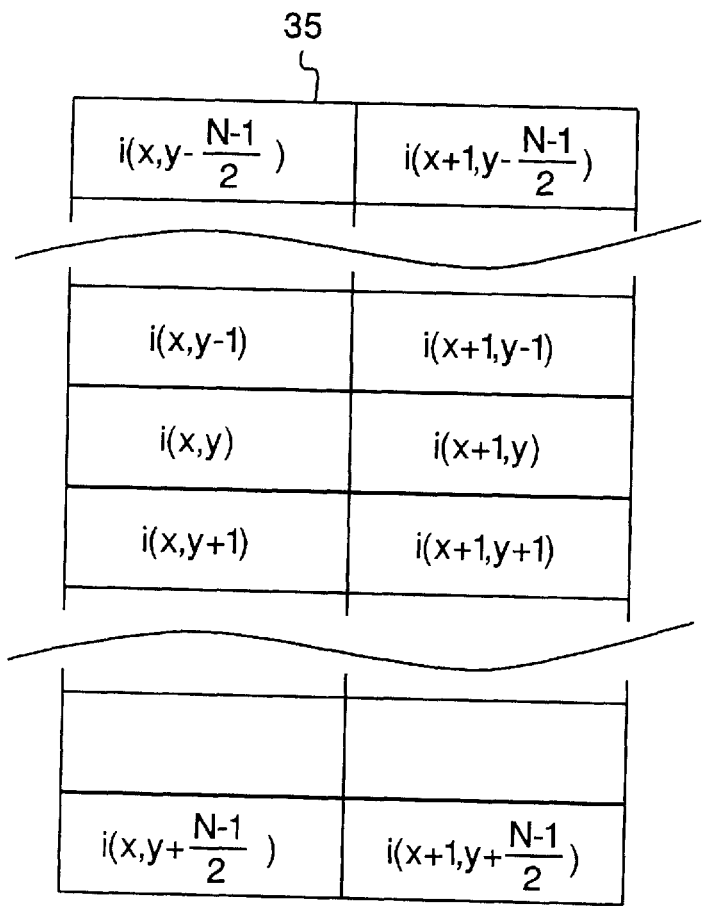
FIG. 5 illustrates a digital mask that is used to test for pixels that are strongly related to each other in a predetermined region.

According to the present invention, a test is performed for a strong relationship in spatial features between pixels and computes $\Delta a_x$ and $\Delta b_x$ only from those pixels where $I(x,y) \approx I(x+1,y)$ thus preventing artifacts due to the processing to remove streaking from occurring. A schematic of the streak removal process 18 disclosed in this invention is shown in FIG. 4. First two adjacent columns of image data are selected 30. Next, a column of pixel value pairs representing the pixel values of the adjacent pixels of the two columns is formed 32. Next a pair of columns of local mean values representing the mean values of pixels in an N pixel window for each of the adjacent columns of image data is formed 34. The local means $\mu(x,y)$ and $\mu(x+1,y)$ are calculated using $$\mu(x,y) = \frac{1}{N} \sum_{n=-\frac{(N-1)}{2}}^{\frac{(N-1)}{2}} i(x, y+n) \qquad (9)$$

where N is the window length. To determine if $I(x,y)=I(x+1,y)$, a mask, such as the mask 35 shown in FIG. 5, is centered at pixel $i(x,y)$ and convolved with the image. Pixels in the first and last $((N-1)/2)$ rows of the image will not be used to determine $\Delta a_x$ and $\Delta b_x$.

Next, a local difference metric $M(x,y)$ is calculated 36 that measures the similarity between local pixel regions. A difference metric based on the difference between the mean reduced values is given by $$M(x,y) = \frac{1}{N} \sqrt{\sum_{n=-\frac{(N-1)}{2}}^{\frac{(N-1)}{2}} \{[i(x, y+n) - \mu(x,y)] - [i(x+1, y+n) - \mu(x+1, y)]\}^2} \qquad (10)$$

The local pixel regions are similar if $M(x,y)<T_M$, where $T_M$ is the difference metric threshold. The optimal value for $T_M$ will depend on the characteristics of the digital sensor 10. A maximum difference threshold, T, is defined by determining the largest magnitude difference of $\Delta(x,y)$ that is possible from calibration differences alone.

To determined the values of $\Delta a_x$ and $\Delta b_x$ in Eq. (7), two columns of pixel values $i_x(n)$ and pixel values $i_{x+1}(n)$, where n is a counting index, are generated 38 for each row x, where only the k values of $i(x,y)$ and $i(x+1,y)$ that satisfy the conditions $M(x,y)<T_M$ and $|\Delta(x,y)|<T_\Delta$ are used.

Figure 6:
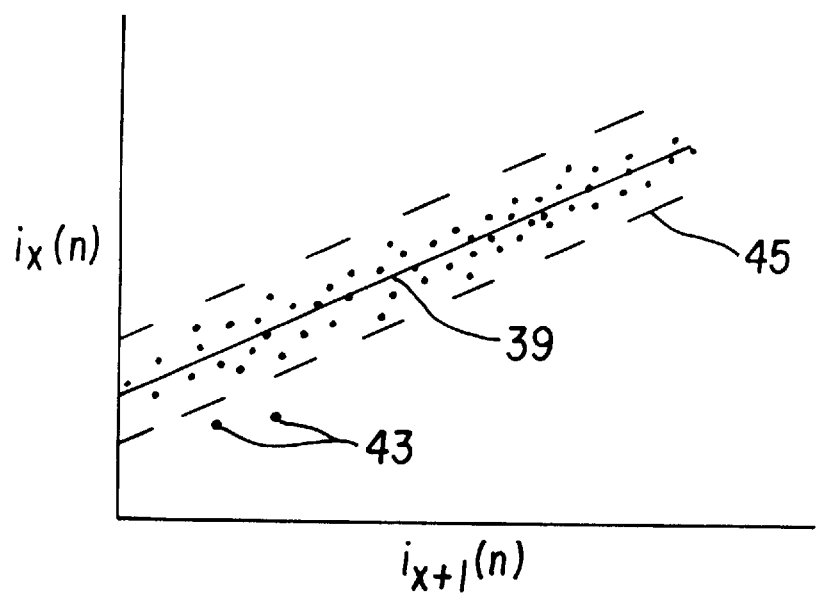
FIG. 6 is a graph illustrating the linear regression with the two adjacent columns of image data, useful in describing the method of the present invention.

Initial estimates of the slope and offset are determined by performing a linear regression between $i_x(n)$ and $i_{x+1}(n)$ to determine the regression line 39 in FIG. 6. The initial estimate of the slope, $\Delta a'_x$, is calculated 40 by $$\Delta a'_x = \frac{k \sum_{n=1}^{k} i_{x+1}(n) i_x(n) - \sum_{n=1}^{k} i_{x+1}(n) \sum_{n=1}^{k} i_x(n))}{k \sum_{n=1}^{k} i_{x+1}^2(n) - \left(\sum_{n=1}^{k} i_{x+1}(n)\right)^2} \qquad (11)$$

where k is the total number of elements in $i_x(n)$. The initial estimate of the offset, $\Delta b'_x$, is calculated 42 by $$\Delta b'_x = \frac{\sum_{n=1}^{k} i_x(n) - \Delta a_x \sum_{n=1}^{k} i_{x+1}(n)}{k} \qquad (12)$$

The slope $\Delta a_x$ and offset $\Delta b_x$ for Eq. (7) are determined by performing a second linear regression between $i_x(n)$ and $i_{x+1}(n)$ after the statistical outliers 43 in FIG. 6 have been removed from the estimates of $\Delta a'_x$ and $\Delta b'_x$. The standard error $s_e$ of the linear regression is calculated 44. The statistical outliers 43 will be defined as points lying outside a boundary 45 that is dependent on the standard error of estimate $s_e$, given by $$s_e = \sqrt{\frac{\sum_{n=1}^{k} [i_x(n) - \hat{i}_x(n)]^2}{k-2}}, \qquad (13)$$

where $$\hat{i}_x(n) = \Delta a_x i_{x+1}(n) + \Delta b_x. \qquad (14)$$

Values of $i(x,y)$ that satisfy the condition $|i_x(n) - \hat{i}_x(n)| < T_S$ are determined 46, these values are not statistical outliers. The outlier threshold $T_S$ is proportional to $s_e$ and is typically set equal to $3s_e$. Two new columns of pixel values, $i_x(n)$ and its adjacent pixel $i_{x+1}(n)$ are generated 48 for each row x, where only the $j \leq k$. The slope $\Delta a_x$ and offset $\Delta b_x$ for Eq. (7) are now determined 50 by $$\Delta a_x = \frac{j \sum_{n=1}^{j} i_{x+1}(n) i_x(n) - \sum_{n=1}^{j} i_{x+1}(n) \sum_{n=1}^{j} i_x(n))}{j \sum_{n=1}^{j} i_{x+1}^2(n) - \left(\sum_{n=1}^{j} i_{x+1}(n)\right)^2} \qquad (15)$$

$$\Delta b_x = \frac{\sum_{n=1}^{j} i_x(n) - \Delta a_x \sum_{n=1}^{j} i_{x+1}(n)}{j}. \qquad (16)$$

The final statistical tests performed 52 are to determine if the slope $\Delta a_x$ is statistically different from unity and the offset $\Delta b_x$ is statistically different from zero. These tests are performed to ensure that the difference in the response curves estimated for detectors $d_x$ and $d_{x+1}$ are statistically different. If they are not statistically different, then using the estimates for $\Delta a_x\_1$ and $\Delta b_x\_0$ may add streaking to the image rather than remove it, hence degrading the quality of the image rather than improving it.

A statistical hypothesis test is used to determine if the slope $\Delta a_x$ is statistically different from unity. The t statistic is given by $$t_{\Delta a_x} = \frac{|\Delta a_x - 1|}{\frac{s}{s_i}} \qquad (17)$$

where $$s = \sqrt{\frac{\left\{\sum_{n=1}^{j} i_x^2(n) - \frac{\left[\sum_{n=1}^{j} i_x(n)\right]^2}{j}\right\} - \Delta a_x \left\{\sum_{n=1}^{j} i_{x+1}(n)i_x(n) - \frac{\sum_{n=1}^{j} i_{x+1}(n) \sum_{n=1}^{j} i_x(n)}{j}\right\}}{j-2}} \qquad (18)$$

$$s_i = \sqrt{\sum_{n=1}^{j} i_{x+1}^2(n) - \frac{\left[\sum_{n=1}^{j} i_{x+1}(n)\right]^2}{j}} \ . \qquad (19)$$

The t statistic is compared to the t distribution value $t\alpha/2$ to determine if $\Delta a_x$ is statistically different from unity. If $t_{\Delta a_x} < t\alpha/2$ then $\Delta a_x$ is not statistically different from unity hence a value of 1 is used 54 for $\Delta a_x$ in Eq. (7). The value used for $t\alpha/2$ depends on the number of sample points j as well as the confidence level desired for the statistical test, which is given by $100(1-\alpha)\%$. For a 95% confidence and $j>50$, $t\alpha/2=1.96$.

To determine if the offset $\Delta b$, is statistically different from zero, the t statistic is given by $$t_{\Delta b_x} = \frac{|\Delta b_x|}{s \sqrt{\frac{\sum_{n=1}^{j} i_{x+1}^2(n)}{j}}} \ . \qquad (20)$$

If $t_{\Delta b_x} < t\alpha/2$ then $\Delta b_x$ is not statistically different from zero hence a value of 0 is used 56 for $\Delta b_x$ in Eq. (7).

Finally, the pixels $i(x+1,y)$ in column x are modified by Eq. (7) to remove the steaks 58. The procedure outlined above is repeated for the next column of image data. This process is continued until all columns of the image data have been processed and the corrected digital image 20 is output.

A listing of a computer program written in the Fortran language running on a Convex computer for performing the method of the present invention is included as Appendix A.

The invention has been described with reference to a preferred embodiment. However, it will be appreciated that variations and modifications can be effected by a person of ordinary skill in the art without departing from the scope of the invention.

APPENDIX A

```
*       Subroutines Called:
*
*       Open_Tiff_Image
*       Read_Tiff_Image
*       Close_Tiff_image
*       Write_Tiff_Image2
*
*
***************************************************************
        Implicit None
        Include         '/cm/include/imgio.inc'
        Integer*4       IMGioPtr, npixels, nlines, Bits, band, datatype
        Character*50    inname, outname
        Character*4     cstdev, cthresh, cc1, cmaxdiff, cconfa, cconfb
        Real*4          Input_Image(:,:),Output_Image(:,:),
                        metric_image(:,:),stdev
        Allocatable     (Input_Image, Output_Image, metric_image)
        Parameter       (band=0)
        Integer*4       X, Y, z, carg, narg, iargc, L, K, i1, i2
```

APPENDIX A-continued

```
        REAL*8          line1(2048), line2(2048), line1a(2048), line2a(2048),
                        metric(2048)
        REAL*8          sum, sum1, sum2, sum11, sum22, sum12, cnt, sd,
                        sumprod, maxdiff
        REAL*8          max, min, max0, min0, MSE, cl, s, si, confa, confb,
                        ta, tb, bias, gain
        REAL*8          slope(2048), offset(2048), diff, linecnt, mean1, mean2,
                        thresh
*
************ Read command line arguments
*
        carg = 1
        narg = iargc()
        IF(carg .le. narg )THEN
            CALL getarg(carg,inname)
            carg = carg + 1
            CALL getarg(carg,outname)
            carg = carg + 1
            CALL getarg(carg,ccl)
                READ(ccl,*) cl
            carg = carg + 1
            CALL getarg(carg,cmaxdiff)
                READ(cmaxdiff,*)maxdiff
            carg = carg + 1
            CALL getarg(carg,cstdev)
                READ(cstdev,*)stdev
            carg = carg + 1
            CALL getarg(carg,cthresh)
                READ(cthresh,*)thresh
            carg = carg + 1
            CALL getarg(carg,cconfa)
                READ(cconfa,*) confa
            carg = carg + 1
            CALL getarg(carg,cconfb)
                READ(cconfb,*)confb
        ELSE
            WRITE(6,*)'Usage: remove_cal input_file output_file
        window_size maxdiff +   stdev_coeff Metric_threshold slope_conf
        offset_conf'
                goto 999
        ENDIF
        Write(6,*) 'RUNNING REMOVE CALIBRATION NOISE
            ROUTINE'
        write(6,*) '*** Only works on 2k or smaller images ***'
        Write(6,*) 'raw input filename =',inname
        Write(6,*) 'output filename =',outname
        Write(6,*) 'window size =',cl
        Write(6,*) 'maximum difference =',maxdiff
        Write(6,*) 'outlier stdev coefficient =',stdev
        Write(6,*) 'MSE threshold =',thresh
        Write(6,*) 'slope confidence t value =',confa
        Write(6,*) 'offset confidence t vatue =',confb
*
************ Read input imagery - pixel & line sizes
*
        CALL Open_Tiff_Image(inname,IMGioPtr,npixels,nlines,Bits)
        ALLOCATE (Input_Image(npixels, nines))
        ALLOCATE (Output_Image(npixels, nlines))
```

APPENDIX A-continued

```
ALLOCATE (metric_Image(npixels, nlines))
CALL Read_Tiff_Image(IMGioPtr,Input_Image,npixels,nlines,Band)
CALL Close_Tiff_Image(IMGioPtr)
************ Determine mean-square error between line segments after
             bias is removed
DO X = 1, npixels-1
   DO Y = int(cl/2)+1, nlines-int(cl/2)
      mean1=0
      mean2=0
      do z=-int(cl/2),int(cl/2)
         mean1=mean1+input_image(x,y+z)/cl
         mean2=mean2+input_image(x+1,y+z)/cl
      enddo
      MSE=0
      do z=-int(cl/2),int(cl/2)
         MSE=MSE+((input_image(x,y+z)-mean1)-(input_image(x+
            1,y+z)-mean2))**2
      enddo
      metric_image(x,y)=sqrt(MSE)
   enddo
enddo
*
************ Determine slope and offset to remove streaks
************ Use only those points that have a low MSE
             (high correlation) between lines
*
DO X = 1, npixels-1
   linecnt = 0
   slope(x)= 1
   offset(x)=0
   DO Y = int(cl/2)+1, nlines-int(cl/2)
      diff = input_image(X+1,Y) - input_image(X,Y)
      IF(metric_image(x,y).le.thresh.and.abs(diff).le.maxdiff)then
         linecnt = linecnt + 1
         line1(linecnt)=input_image(x,y)
         line2(linecnt)=input_image(x+1,y)
      ENDIF
   ENDDO
   if(linecnt.gt.2)then
      sum1 = 0.0
      sum2 = 0.0
      sum12 = 0.0
      sum22 = 0.0
      sum11 = 0.0
      DO Y = 1, linecnt
         sum1 = sum1 + line1(y)
         sum2 = sum2 + line2(y)
         sum12 = sum12 + line1(y)*line2(y)
         sum11 = sum11 + line1(y)**2
         sum22 = sum22 + line2(y)**2
      ENDDO
      slope(x)=(linecnt*sum12-sum1*sum2)/(linecnt*sum22-sum2**2)
      offset(x)=(sum1-stope(x)*sum2)/linecnt
*     calculate standard error
      sum = 0.0
      DO Y = 1, linecnt
         sum = sum + (line1(y)-slope(x)*line2(y)-offset(x))**2
      ENDDO
      sd = sqrt(sum/(linecnt-2))
*     throw away outliers to improve calculation
      cnt = 0.0
      DO Y = 1,linecnt
         IF(abs(line1(y)-slope(x)*line2(y)-offset(x)).le.(stdev*sd))THEN
            cnt = cnt + 1
            line1a(cnt)=line1(y)
            line2a(cnt)=line2(y)
         ENDIF
      ENDDO
      if(cnt.gt.2)then
         linecnt=cnt
         sum1 = 0.0
         sum2 = 0.0
         sum12 = 0.0
         sum22 = 0.0
         sum11 = 0.0
         DO Y = 1,cnt
            sum1 = sum1 + line1a(y)
            sum2 = sum2 + line2a(y)
            sum12 = sum12 + line1a(y)*line2a(y)
            sum11 = sum11 + line1a(y)**2
            sum22 = sum22 + line2a(y)**2
         ENDDO
         slope(x)=(cnt*sum2-sum1*sum2)/(cnt*sum22-sum2**2)
         offset(x)=(sum1-slope(x)*sum2)/cnt
      endif
      s=sqrt(abs(sum11-sum1**2/linecnt-slope(x)*(sum12-
         sum1*sum2/linecnt))/(linecnt-2))
      si=sqrt(abs(sum22-sum2**2/linecrt))
      ta=si*abs(slope(x)-1)/s
      tb=si*abs(offset(x)-0)/s/sqrt(sum22/cnt)
      if(ta.lt.confa)then
         slope(x)=1
         offset(x)=(sum1-slope(x)*sum2)/cnt
      endif
      if(tb.lt.confb)offset(x)=0
   endif
ENDDO
*
************ remove calibration differences
*
DO Y = 1,nlines
   output_image(1,y)=input_image(1,y)
ENDDO
bias=0
gain=1
DO X = 1, npixels-1
   bias=bias+offset(x)
   gain=gain*slope(x)
   DO Y = 1, nlines
      output_image(x+1,y)=gain*input_image(x+1,y)+bias
   ENDDO
ENDDO
*
************ DRA to avoid clipping
*
min = 10000
max = -10000
DO Y = 1, nlines
   DO X = 1, npixels
      IF(output_image(X,Y).lt.min)min = output_image(X,Y)
      IF(output_image(X,Y).gt.max)max = output_image(X,Y)
   ENDDO
ENDDO
max0=2047
min0=0
DO Y = 1, nlines
   DO X = 1, npixels
      output_image(X,Y) = NINT((max0-min0)*(output_image(X,Y)-
         min)/(max-min)+min0)
   ENDDO
ENDDO
*
************ Write output image
*
Datatype = 7
write(6,*)' '
write(6,*)'Writing Output Imagery'
write(6,*)' '
   Call Write_Tiff_Image2( Outname, Output_Image, NPixels,
+  Nlines, Datatype, Band, bits)
      goto 999
*
************ END - OF - ROUTINE
*
999 END
```

| PARTS LIST |
|---|
| 2 streaks |
| 4 banding |
| 6 scene variation |
| 8 image artifact |
| 10 digital sensor |
| 12 digital image |

-continued

PARTS LIST 14 detector equalization
16 equalized image
18 streak removal process
20 corrected digital image
22 image processing and enhancements
24 final processed image
30 selecting two adjacent columns of pixels step
32 create two columns of adjacent pixel values step
34 calculate local means step
35 mask used for testing pixel relationship
36 calculate local difference metric step
38 remove pixel values from columns of pixel values that exceed thresholds step
39 line from linear regression
40 determine initial estimate of slope step
42 determine initial estimate of offset step
43 statistical outliers
44 calculate standard error of linear regression step
45 statistical outlier boundary
46 determine statistical outliers step
48 remove statistical outliers from columns of pixel values step
50 determine new estimate of slope and offset step
52 determine t statistics for slope and offset step
54 set slope to unity if not statistically different from unity step
56 set offset to zero if not statistically different from zero step
58 remove streaking using slope and offset values step

We claim:

1. In a method of removing columnar streaks from a digital image of the type in which it is assumed that pixels in a predetermined region near a given pixel are strongly related to each other and employing gain and offset values to compute streak removal information, the improvement comprising: testing for a strong relation between the pixels in a predetermined region near a given pixel and computing streak removal information only if such a strong relationship exists, whereby image content that does not extend the full length of the image in the column direction will not be interpreted as a streak.

2. A method of removing streaking in a digital image, comprising the steps of:
   a) detecting pixel locations in the image where pixel-to-pixel differences caused by streaking can be distinguished from normal variations in the scene data;
   b) performing a linear regression to determine an initial estimate of the gain and offset values between each pair of adjacent pixels in a direction perpendicular to the streaking using the pixel values at the detected locations;
   c) performing a statistical outlier analysis to remove the pixel values that are not from streaking;
   d) performing a linear regression to determine the gain and offset values between each pair of adjacent pixels in a direction perpendicular to the streaking using the pixel values at the detected locations that are not statistical outliers;
   e) setting the slope value to unity if it is not statistically different from unity;
   f) setting the offset value to zero if it is not statistically different from zero;
   g) using the slope and offset values to remove streaking from the corresponding line of image data.

3. A method for removing columnar streaks in a digital image, comprising the steps of:
   a) selecting first and second adjacent columns of pixels from the digital image;
   b) forming a column of pixel value pairs, representing the pixel values of the adjacent pixels in the two columns;
   c) forming a pair of columns of local mean values, representing the mean values of pixels in an N-pixel window for each column;
   d) forming first and second columns of mean-reduced values, representing the pixel value minus the corresponding local mean values in each column;
   e) forming a column of difference metric values, representing the sum of the squares of the difference between corresponding mean reduced values in an N-pixel window;
   f) forming a first reduced column of pixel value pairs by removing from the column of pixel value pairs, those pixel values whose absolute difference between the pairs is greater than a predetermined difference threshold;
   g) forming a second reduced column of pixel value pairs by removing from the first reduced column of pixel value pairs, those pixel values whose corresponding difference metric values are greater than a predetermined difference metric threshold;
   h) forming first slope, offset, and standard error values by performing a linear regression between the pair of pixel values in the second reduced column of pixel value pairs;
   i) forming a column of linear prediction values using the slope and offset values and the first pixel value of the pair of pixel values in the second reduced column of pixel value pairs;
   j) forming a column of regression error values, representing the difference between the second pixel value of the pair of pixel values in the second reduced column of pixel value pairs and the corresponding linear regression prediction value;
   k) forming a third reduced column of pixel value pairs by removing from the first reduced column of pixel value pairs, those pixel values whose corresponding regression error values are greater than a predetermined regression error threshold related to the standard error value;
   l) forming second slope and offset values by performing a linear regression between the pair of pixel values in the third reduced column of pixel value pairs;
   m) setting the second slope value equal to unity if it is determined to not be statistically different from unity;
   n) setting the second offset value equal to zero if it is determined to not be statistically different from zero;
   o) adjusting the value of each pixel in the second column of pixels in the digital image by multiplying each value by the second slope value and then subtracting the second offset value;
   p) repeating steps a–o for all adjacent columns of pixel values in the image.

* * * * *